Patented Mar. 2, 1943

2,312,690

UNITED STATES PATENT OFFICE 2,312,690

REACTION PRODUCT OF ALDEHYDES AND TRIAZINE DERIVATIVES

Gaetano F. D'Alelio, Pittsfield, Mass., assignor to General Electric Company, a corporation of New York No Drawing. Application November 1, 1941, Serial No. 417,502

20 Claims. (Cl. 260—72)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazine derivative corresponding to the following general formula:

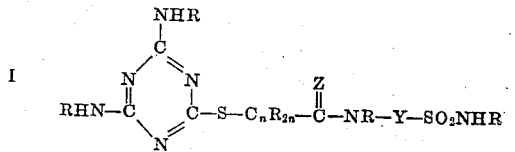

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halohydrocarbon radicals. Since $n$ represents an integer which is 1 or 2, it will be seen that the linkage of the sulfamyl-carbocyclic-carbamyl-alkyl or sulfamyl-carbocyclic-thiocarbamyl-alkyl grouping to the sulfur atom in all cases will be alpha or beta to the sulfamyl-carbocyclic-carbamyl or thiocarbamyl grouping. It also will be observed that linkage of the triazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenyl-isopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromo-propyl, bromotolyl, etc. Preferably R in the above formula is hydrogen. Also especially suitable for use in carrying the present invention into effect are triazine derivatives corresponding to the general formulas:

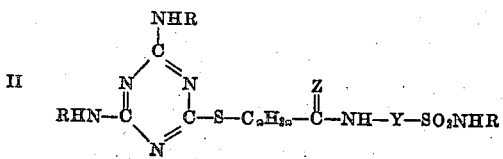

and, more particularly

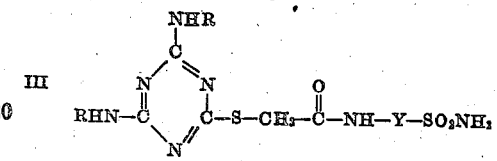

where $n$, Z, Y and R have the same meanings as above given with reference to Formula I.

Illustrative examples of divalent carbocyclic radicals that Y in Formulas I, II and III may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, carbalkoxy, alkoxy, aryloxy, hydroxy, alkyl alkenyl, etc. Specific examples of substituted divalent carbocyclic radicals are chlorophenylene, bromophenylene, chloronaphthylene, bromonaphthylene, bromo 1,4-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, hydroxyphenylene, methylphenylene (tolylene), allylphenylene, etc. Preferably Y is phenylene or methylphenylene.

Instead of the symmetrical triazines (s-triazines) represented by the above formulas, corresponding derivatives of the asymmetrical and vicinal triazines may be used. Also, instead of the triazinyl monosulfides represented by the above formulas, the di- and tri-sulfides of the triazines (symmetrical, asymmetrical or vicinal) may be employed.

The triazine derivatives that are used in carrying the present invention into effect are more fully described and claimed in my copending application Serial No. 417,504, filed concurrently herewith and assigned to the same assignee as the present invention. As pointed out in the said copending application, the triazine derivatives used as starting reactants in practicing the present invention are prepared by effecting reaction between a diamino [(—NHR)₂] mercapto s-triazine and a sulfamyl-carbocyclic-carbamyl(or thiocarbamyl)-alkyl halide in the presence of a hydrohalide acceptor, e. g., an alkali-metal hydroxide. The reaction preferably is effected in the presence of a suitable solvent or mixture of solvents, e. g., water or a mixture of water and alcohol. These triazine derivatives also may be prepared by effecting reaction between a halogenated diamino s-triazine and a sulfamyl-carbocyclic-carbamyl(or thiocarbamyl)-mercapto alkane in the presence of a hydrohalide acceptor. This reaction preferably is carried out in the presence of an anhydrous solvent, e. g., alcohol.

Specific examples of triazinyl sulfamyl-carbocyclic-carbamyl-alkyl sulfides and triazinyl sulfamyl-carbocyclic-thiocarbamyl-alkyl sulfides that may be used in producing my new condensation products are listed below:

4,6-diamino s-triazinyl-2 para-sulfamyl-phenyl-carbamyl-methyl sulfide (2,6-diamino s-triazinyl - 4 para - sulfamyl - phenyl - carbamyl-methyl sulfide; 2,4-diamino s-triazinyl-6 para-sulfamyl-phenyl-carbamyl-methyl sulfide)

4,6-diamino s-triazinyl-2 para-sulfamyl-phenyl-thiocarbamyl-methyl sulfide 4,6-diamino s-triazinyl-2 para-sulfamyl-tolyl-carbamyl-methyl sulfide 4,6-diamino s-triazinyl-2 beta-(para-sulfamyl-phenyl-carbamyl-ethyl) sulfide 4,6-diamino s-triazinyl-2 beta-(para-sulfamyl-phenyl-thio-carbamyl-ethyl) sulfide 4,6-di-(methylamino) s-triazinyl-2 beta-(para-sulfamyl-phenyl-carbamyl-ethyl) sulfide 4,6-di-(anilino) s-triazinyl-2 alpha-(meta-sulfamyl-phenyl-carbamyl-ethyl) sulfide 6-amino 4-ethylamino s-triazinyl-2 alpha-[(para-sulfonyl methylamide)-phenyl - thiocarbamyl-pentyl] sulfide 4,6-di-(propylamino) s-triazinyl-2 ortho-sulfamyl-phenyl-(methyl)-carbamyl-methyl sulfide 4-allylamino 6-butylamino s-triazinyl-2 beta-(4'-sulfamyl-naphthyl-[1']-carbamyl-3''-butenyl) sulfide 4-butylamino 6-cyclopentylamino s-triazinyl-2 beta -[para-sulfamyl-chlorophenyl - carbamyl-(alpha-ethyl beta-phenyl)-ethyl] sulfide 4-(3'-butenylamino) 6-propylamino s-triazinyl-2 para-(sulfonyl amylamide)-tolyl - carbamyl-(cyclopentyl)-methyl sulfide 4-amylamino 6-cyclohexylamino s-triazinyl-2 para-(sulfonyl 3'-butenylamide) chlorotolyl-(butyl)-carbamyl-methyl sulfide 4-hexylamino 6-xenylamino s-triazinyl-2 para-(sulfonyl cyclohexylamide) - phenyl - (cyclopentyl)-thiocarbamyl-methyl sulfide 4-cyclohexenylamino 6-naphthylamino s-triazinyl-2 para-(sulfonyl phenylamide)-phenyl-(chloroethyl)-carbamyl-methyl sulfide 4-chlorocyclopentylamino 6-toluido s-triazinyl-2 (4' - sulfonyl chlorotolylamide) - cyclohexyl - (phenyl)-carbamyl-methyl sulfide 4-cyclopentenylamino 6-xylidino s-triazinyl-2 3'-sulfamyl-cyclopentyl-carbamyl-(tolyl) - methyl sulfide 4-bromotoluido 6-benzylamino s-triazinyl-2 beta-[(para-sulfonyl propylphenylamide)-phenyl-(bromophenyl)-thiocarbamyl-ethyl] sulfide 4-phenylchloroethylamino 6-phenethylamino s-triazinyl-2 beta-[(para-sulfonyl phenylchloroethylamide)-phenyl-(xenyl)-carbamyl-(alpha-chlorotolyl)-ethyl] sulfide 4-anilino 6-ethylanilino s-triazinyl-2 meta-(sulfonyl naphthylamide)-phenyl-carbamyl-methyl sulfide 4-(chlorocycloheptylamino) 6-propylphenylamino s-triazinyl-2 meta-(sulfonyl chloroethylamide)-phenyl-carbamyl-methyl sulfide 4-propylanilino 6-phenylpropylamino s-triazinyl-2 beta-[para-sulfamyl-phenyl-carbamyl-(alpha-bromophenyl)-ethyl] sulfide 4-dichloroanilino 6-chloroethylamino s-triazinyl-2 para-(sulfonyl butylphenylamide)-phenyl-carbamyl-(naphthyl)-methyl sulfide 4-bromoethylamino 6-amino triazinyl-2 alpha-(para-sulfamyl-phenyl-carbamyl-chlorobutyl) sulfide 4,6-diamino triazinyl-2 (sulfonyl propylamide)-cyclohexenyl-(methyl)-carbamyl-(alpha, beta-diphenyl alpha-methyl-beta-chlorobutyl)-ethyl sulfide 4,6-diamino s-triazinyl-2 beta-(para-sulfamyl-tolyl-carbamyl-ethyl) sulfide 4,6-diamino s-triazinyl-2 para-sulfamyl-tolyl-thiocarbamyl-methyl sulfide 4,6-diamino s-triazinyl-2 meta-sulfamyl-phenyl-carbamyl-methyl sulfide 4,6-diamino s-triazinyl-2 ortho-sulfamyl-phenyl-carbamyl-methyl sulfide The formulas for most of the above compounds are shown in my above-identified copending application Serial No. 417,504.

The present invention is based on my discovery that new and valuable materials of particular utility in the plastics and coating arts can be produced by effecting reaction between ingredients comprising essentially an aldehyde, including polymeric aldehydes and aldehyde-addition products, and certain triazinyl sulfamyl-carbocyclic-carbamyl (or thiocarbamyl)-alkyl sulfides, numerous examples of which have been given above and in my above-identified copending application.

Resins heretofore have been made by condensing an aldehyde with a thioammeline ether, but such resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulfides used in practicing this invention contain aldehyde-reactable thio groups attached to the triazine nucleus, thereby imparting to the condensation products of such sulfides with aldehydes increased heat-, water- and abrasion-resistance and improved curing characteristics as compared with resinous condensation products of an aldehyde and a thioammeline ether.

In carrying my invention into effect the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining akaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., ketones, urea (NH$_2$CONH$_2$), thiourea, selenourea, iminourea (guanidine), substituted ureas, thioureas, selenoureas and iminoureas, more particularly diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylol ureas, methylene ureas, dicyandiamide (cyano imino urea), guanyl urea, guanyl thiourea, biguanidine and guanoline (guanido carbonic ethyl ester); monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam and melon; phenol and substituted phenols e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the triazine derivative and the aldehyde by mixing all the reactants and effecting condensation therebetween or by various permutations of reactants. For instance, I may form a partial condensation product of ingredients comprising urea or melamine or urea and melamine, a triazine derivative of the kind herein described (for example, diamino s-triazinyl para-sulfamyl-phenyl-carbamyl-methyl sulfide, etc.) and an aldehyde, including polymeric aldehydes and aldehyde-addition products, for instance formaldehyde, paraformaldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have good surface finish and excellent resistance to water and arcing. They have a high dielectric strength.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| Diamino s-triazinyl para-sulfamyl-phenyl-carbamyl-methyl sulfide (4,6-diamino s-triazinyl-2 para-sulfamyl-phenyl-carbamyl-methyl sulfide; 2,6-diamino s-triazinyl-4 para-sulfamyl-phenyl-carbamyl-methyl sulfide; 2,4-diamino s-triazinyl-6 para-sulfamyl-phenyl - carbamyl - methyl sulfide) | 32.5 |
| Aqueous formaldehyde (approx. 37.1% HCHO) | 32.4 |
| Sodium hydroxide (0.46 N) | 1.0 |
| Glycine | 0.3 |
| Water | 50.0 |

The triazine derivative was added to the aqueous formaldehyde solution. An exothermic reaction immediately followed. The sodium hydroxide was added as quickly as possible. A taffy-like resinous material was obtained. Water was added to the reaction mass, together with the above-stated amount of glycine. The mixture was rapidly stirred until a homogeneous mass resulted. A molding compound was made from the resulting product by mixing therewith 23 parts alpha cellulose in flock form and 0.1 part of a mold lubricant, specifically zinc stearate. The wet mixture was dried at room temperature until sufficient moisture had been removed to provide a molding compound that could be molded satisfactorily. A sample of the dried and ground molding compound was molded for 5 minutes at 140° C. under a pressure of 4,500 pounds per square inch, yielding a well-molded article.

*Example 2*

| | Parts |
|---|---|
| Diamino s-triazinyl para-sulfamyl-phenyl-carbamyl-methyl sulfide | 8.9 |
| Urea | 30.0 |
| Aqueous formaldehyde (approx. 37.1% HCHO) | 72.9 |
| Aqueous ammonia (approx. 28% NH$_3$) | 3.0 |
| Sodium hydroxide (0.46 N) | 1.0 |
| Chloroacetamide (monochloroacetamide) | 0.3 |

All of the above components with the exception of the triazine derivative and the chloroacetamide were heated together under reflux at the boiling temperature of the mass for 5 minutes. The triazine derivative was added and refluxing was continued for an additional 5 minutes. Thereafter the chloroacetamide was added and heating under reflux was continued for a further 5-minute period. A molding compound was made from the resulting clear syrup by mixing therewith 38.9 parts alpha cellulose and 0.2 part zinc stearate. The resulting wet molding compound was dried at room temperature as described under Example 1. A sample of the dried and ground molding compound was molded for 5 minutes at 140° C. under a pressure of 4,500 pounds per square inch. The molded piece was well cured throughout and had a well-knit and homogeneous structure. It showed good flow characteristics during molding. The molded piece was more resistant to water than the ordinary urea-formaldehyde resins and molded articles made therefrom, as evidenced by the fact that when the piece was immersed in boiling water for 15 minutes, followed by immersion in cold water for 5 minutes, it absorbed only 3.4% by weight of water. This compares with a water-absorption value of about 5% to 7% for molded articles similarly made from unmodified urea-formaldehyde resins.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.) or latent curing catalysts (e. g., sodium chloroacetate, N-diethyl chloroacetamide, glycine ethyl ester hydrochloride, etc.) or by intercondensation with curing reactants other than monochloroacetamide (e. g., di- and tri-chloroacetamides, chloroacetonitriles, alpha, beta-dibromopropionitrile, aminoacetamide hydrochloride, aminoacetonitrile hydrochloride, ethylene diamine monohydrochloride, diethanolamine hydrochloride, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention, and wherein the following curing reactants, among others, specifically are mentioned: gamma-chlorobutyronitrile, chloroacetyl hydantoate, chloral hydrate, alpha,-alpha'-dichloroacetone and para-chlorophenyl phenacyl bromide.

*Example 3*

| | Parts |
|---|---|
| Diamino s-triazinyl para-sulfamyl-phenyl-carbamyl-methyl sulfide | 8.9 |
| Melamine | 37.0 |
| Aqueous formaldehyde (approx. 37.1% HCHO) | 72.9 |
| Aqueous ammonia (approx. 28% NH$_3$) | 1.7 |
| Sodium hydroxide (0.46 N) | 2.0 |
| Chloroacetamide | 0.3 |

All of the above components with the exception of the chloroacetamide were heated together under reflux at boiling temperature for 18 minutes. The chloroacetamide was added to the resulting hot syrup and the mixture was immediately compounded with 41.2 parts alpha cellulose and 0.2 part zinc stearate. The resulting wet molding compound was dried at room temperature as described under Example 1. A sample of the dried and ground molding composition was molded for 5 minutes at 140° C. under a pressure of 4,500 pounds per square inch. The molded piece showed good flow characteristics during molding. It was well cured throughout and was well knitted together and homogeneous in texture. It had a smooth, glossy surface finish. The molded piece had excellent resistance to water as shown by the fact that, when tested for its water-absorption characteristics as described under Example 2, it showed a water-absorption value of only 0.29%.

*Example 4*

A phenol-formaldehyde liquid partial condensation product was prepared by heating together 90 parts phenol and 195 parts of an aqueous formaldehyde solution containing approximately 37.1% HCHO for 4 hours at 65° to 70° C., using 2.85 parts of potassium carbonate as a condensation catalyst. This partial condensation product is described in the following formula as "phenolic resin syrup":

| | Parts |
|---|---|
| Phenolic resin syrup | 60.0 |
| Diamino s-triazinyl para-sulfamyl-phenyl-carbamyl-methyl sulfide | 8.9 |
| Sodium hydroxide (0.46 N) | 1.0 |
| Oxalic acid | 1.1 |

All of the above components with the exception of the oxalic acid were heated together under reflux for 22 minutes, at the end of which period of time resinification had advanced to the point where there was a slight clouding of the solution around the edges of the reaction vessel. The oxalic acid dissolved in a small amount of water was now added to the reaction mass. A molding composition was made from the resulting syrupy condensation product by mixing it with 23.7 parts alpha cellulose and 0.1 part zinc stearate. The homogeneous molding compound was dried at room temperature as described under Example 1. A sample of the dried and ground molding composition was molded into the form of a disk at 140° C. under a pressure of 4,500 pounds per square inch, using a molding time of 10 minutes. The molded disk was well cured throughout and had a well-knit and homogeneous structure. It showed excellent flow characteristics during molding. The molded piece had excellent water resistance, as shown by the fact that when tested for its water-absorption characteristics as described under Example 2 it absorbed only 0.87% by weight of water.

Example 5

| | Parts |
|---|---|
| Diamino s-triazinyl para-sulfamyl-phenyl carbamyl-methyl sulfide | 17.8 |
| Aqueous ammonia (approx. 28% NH₃) | 1.7 |
| Trimethylol melamine (crystalline) | 64.8 |
| Sodium hydroxide (0.46 N) | 2.0 |
| Water | 150.0 |
| Chloroacetamide | 0.3 |

All of the above components with the exception of the chloroacetamide were heated together under reflux at the boiling temperature of the mass for 15 minutes. The chloroacetamide was now added and the resulting syrupy mixture was immediately compounded with 55.5 parts alpha cellulose and 0.25 part zinc stearate to form a molding compound. The wet molding compound was dried at room temperature as described under Example 1. A sample of the dried and ground molding composition was molded for 4 minutes at 140° C. under a pressure of 4,500 pounds per square inch. The molded piece was well cured, well knit and homogeneous. It showed good plastic flow during molding. When tested for its water-absorption characteristics as described under Example 2, it absorbed only 0.23% by weight of water.

The polymethylol melamine mentioned in the above formula may be replaced in whole or in part by other aldehyde-addition products, e. g., dimethylol urea.

Example 6

| | Parts |
|---|---|
| Diamino s-triazinyl para-sulfamyl-phenyl-carbamyl-methyl sulfide | 107.0 |
| Acrolein | 67.0 |
| Sodium hydroxide (0.46 N) | 5.8 |
| Water | 100.0 |

When the above components were mixed together an exothermic reaction took place immediately. Nevertheless the mixture was heated under reflux at boiling temperature for 5 minutes. A viscous taffy-like insoluble resin was obtained. This viscous, resinous mass hardened upon cooling to room temperature. The resin is potentially heat-curable as evidenced by the fact that when small samples of it were treated with various curing agents (e. g., sulfamic acid, glycine, chloroacetamide, sodium chloroacetate, chloral urea and trichloroacetamide), followed by heating on a 140° C. hotplate, the viscous resinous mass was converted to an infusible solid.

Example 7

| | Parts |
|---|---|
| Diamino s-triazinyl para-sulfamyl-phenyl-carbamyl-methyl sulfide | 107.0 |
| Acetamide | 8.9 |
| Aqueous formaldehyde (approx. 37.1% HCHO) | 170.0 |
| Aqueous ammonia (approx. 28% NH₃) | 10.7 |
| Sodium hydroxide (0.46 N) | 6.7 |

The above components were heated together under reflux until the syrupy condensation product showed signs of clouding. The resinous syrup was tested for its curing characteristics by treating small samples of it with various curing agents and heating the resulting mixture on a 140° C. hotplate. Sulfamic acid, glycine, phenacyl chloride, trichloroacetamide and chloral urea were used as curing agents. In all cases these agents caused the syrupy condensation product to convert rapidly at 140° C. to a cured or insoluble and infusible state. Instead of these curing agents, other curing agents such as mentioned under Example 2 may be employed.

The resinous composition of this example is especially suitable for use in the preparation of thin, molded plastic materials, for example, flexible covers and novelty articles that are made in thin cross-sections.

Example 8

| | Parts |
|---|---|
| Diamino s-triazinyl para-sulfamyl-phenyl-carbamyl-methyl sulfide | 107.0 |
| Aqueous formaldehyde (approx. 37.1% HCHO) | 122.0 |
| Butyl alcohol | 89.0 |
| Aqueous ammonia (approx. 28% NH₃) | 10.7 |
| Sodium hydroxide (0.46 N) | 10.6 |

All of the above components were heated together under reflux at boiling temperature for 17 minutes. The resulting resinous syrup was dehydrated by heating it on a steam plate. The dehydrated resin was found to be soluble in ethyl alcohol, butyl alcohol and ethylene glycol. Coating compositions were made by dissolving a sample of the resin in butyl alcohol. A small amount of a curing agent, specifically hydrochloric acid, was added to a part of the resinous solution. Samples of the coating composition (both with and without the curing agent) were applied to glass plates. The coated plates were heated for several hours at 100° C. In all cases baked films were obtained that were transparent, water-white, water-resistant and smooth.

The solubility and film-forming characteristics of the resinous composition of this example make it especially suitable for use in the production of spirit and baking varnishes. It may be used as a modifier of varnishes of the aminoplast and alkyd-resin types.

Example 9

| | Parts |
|---|---|
| Diamino s-triazinyl para-sulfamyl-phenyl-carbamyl-methyl sulfide | 107.0 |
| Aqueous formaldehyde (approx. 37.1% HCHO) | 122.0 |
| Diethyl malonate | 32.0 |
| Aqueous ammonia (approx. 28% NH₃) | 10.7 |
| Sodium hydroxide (0.46 N) | 8.7 | were heated together under reflux at boiling temperature for 17 minutes, yielding a clear syrup. The plasticizing effect of the diethyl malonate was evident from the relatively slow curing of the dehydrated resin when tested on a 140° C. hotplate. Even with curing agents such as sulfamic acid, glycine and hydrochloric acid, the composition remained thermoplastic for several minutes at 140° C. before converting to an infusible state. A sample of the hydrochloric acid-treated resin was dissolved in butyl alcohol and the resulting solution applied to a glass plate. The coated plate was heated at 100° C. for several hours. The baked film was transparent, water-white, water-resistant, smooth and was quite resistant to abrasion.

The resinous composition of this example is especially suitable for use as a modifier of film-forming compositions. It also may be used advantageously as a modifier of rapidly curing aminoplasts to control their curing characteristics.

*Example 10*

|  | Parts |
|---|---|
| Diamino s-triazinyl para-sulfamyl-phenyl-carbamyl-methyl sulfide | 107.0 |
| Aqueous formaldehyde (approx. 37.1% HCHO) | 122.0 |
| Glycerine | 18.4 |
| Aqueous ammonia (approx. 28% NH₃) | 10.7 |
| Sodium hydroxide (0.46 N) | 8.2 | were heated together under reflux at boiling temperature for 20 minutes, yielding a clear resinous syrup. A portion of this syrup, when poured on a 140° C. hotplate, formed a sheet having excellent cohesive characteristics. The syrupy condensation product of this example is potentially heat-hardenable, as shown by the fact that when small samples of it were treated with various curing agents (e. g., glycine, sulfamic acid, alpha, beta-dibromopropionitrile, chloroacetamide, sodium chloroacetate, etc.), followed by heating on a 140° C. hotplate, the syrup was converted into an insoluble and infusible state.

Another portion of the syrupy condensation product was dehydrated and dissolved in butyl alcohol. When this solution of the resin was treated with a curing agent, specifically a small amount of hydrochloric acid, and the resulting product baked in film form on a glass surface for several hours at 100° C., a baked film that was hard, water-resistant, water-white, smooth, glossy and transparent was obtained. The addition of the curing agent provides a resinous film that is slightly harder than films similarly made in the absence of a curing agent.

It will be understood, of course, by those skilled in the art that my invention is not limited to condensation products obtained by reaction of ingredients comprising an aldehyde and the specific diamino s-triazinyl sulfamyl-carbocyclic-carbamyl-alkyl sulfide named in the above illustrative examples. Thus, instead of diamino s-triazinyl para-sulfamyl-phenyl-carbamyl-methyl sulfide mentioned in the above examples, any other organic sulfide of the kind with which this invention is concerned may be employed, for example, diamino s-triazinyl ortho-sulfamyl-phenyl-carbamyl-methyl sulfide, diamino s-triazinyl meta-sulfamyl-phenyl-carbamyl-methyl sulfide, the diamino s-triazinyl sulfamyl-phenyl-thiocarbamyl-methyl sulfides, the diamino s-triazinyl sulfamyl-tolyl-carbamyl-methyl sulfides, the diamino s-triazinyl sulfamyl-phenyl-carbamyl-ethyl sulfides, the diamino s-triazinyl sulfamyl-phenyl-thiocarbamyl-ethyl sulfides, the diamino s-triazinyl sulfamyl-tolyl-carbamyl-ethyl sulfides, the diamino s-triazinyl sulfamyl-thiocarbamyl-ethyl sulfides, and others such as hereinbefore mentioned by way of illustration.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydric reactant to the triazine derivative may be varied over a wide range, but ordinarily the reactants are employed in an amount corresponding to at least one mol of the aldehyde, specifically formaldehyde, for each mol of the triazine derivative. Thus, I may use, for example, from one to five or six mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, 10 or 12 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acryloamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in my copending application Serial 289,273, filed August 9, 1939, now Patent No. 2,281,559, issued May 5, 1942; and others.

The modifying bodies also may take the form of high molecular weight bodies with or without resinous characteristics, for example, hydrolyzed wood products, formalized cellulose derivatives, lignin, protein-aldehyde condensation products, diazine-aldehyde condensation products, aminotriazolealdehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazine derivative of the kind herein described and an aldehyde, e. g., formaldehyde, I may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic salicylic, phthalic, camphoric, etc.

Dyes, pigments, plasticizers, mold lubricants, opacifiers, and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrical insulating applications.

What I claim as new and desire to secure by Letters Patent of the United States is:

1. A composition of matter comprising the reaction product of ingredients comprising an aldehyde and a compound corresponding to the general formula

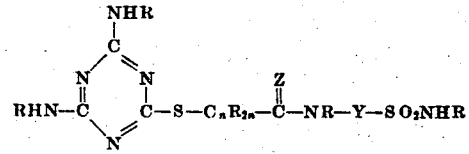

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition of matter comprising the reaction product of ingredients comprising an aldehyde and a compound corresponding to the general formula

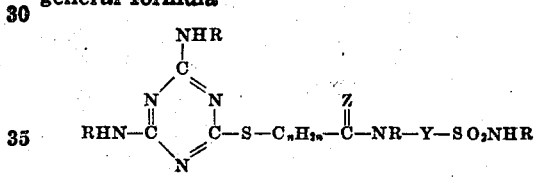

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

5. A heat-curable resinous composition comprising a heat-convertible condensation product of ingredients comprising formaldehyde and a compound corresponding to the general formula

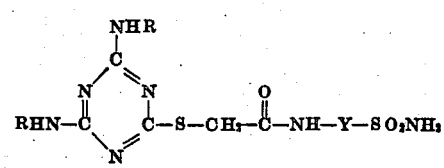

where Y represents a divalent carbocyclic radical and R represents a member of the class consisting of hydrogen and monovalent hydrocarbon and halo-hydrocarbon radicals.

6. A product comprising the heat-cured resinous composition of claim 5.

7. A resinous composition comprising the product of reaction of ingredients comprising an aldehyde and a diamino s-triazinyl sulfamyl-carbocyclic-carbamyl-methyl sulfide.

8. A resinous composition comprising the product of reaction of ingredients comprising formaldehyde and a diamino s-triazinyl sulfamyl-phenyl-carbamyl-methyl sulfide.

9. A resinous composition comprising the product of reaction of ingredients comprising an aldehyde and a diamino s-triazinyl sulfamyl-tolyl-carbamyl-methyl sulfide.

10. A composition comprising the product of reaction of ingredients comprising a urea, an aldehyde and a compound corresponding to the general formula

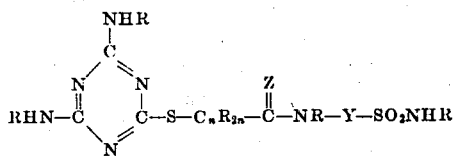

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

11. A composition as in claim 10 wherein the urea component is the compound corresponding to the formula $NH_2CONH_2$ and the aldehyde is formaldehyde.

12. A heat-curable composition comprising the heat-convertible resinous reaction product of (1) a partial condensation product of ingredients comprising formaldehyde and a diamino s-triazinyl sulfamyl-carbocyclic-carbamyl-methyl sulfide, and (2) a curing reactant.

13. A resinous composition as in claim 12 wherein the curing reactant is a chlorinated acetamide.

14. A product comprising the heat-cured composition of claim 12.

15. A composition comprising the product of reaction of ingredients comprising urea, formaldehyde and a diamino s-triazinyl sulfamyl-phenyl-carbamyl-methyl sulfide.

16. A composition comprising the product of reaction of ingredients comprising a methylol urea and a diamino s-triazinyl sulfamyl-phenyl-carbamyl-methyl sulfide.

17. A composition comprising the product of reaction of ingredients comprising a polymethylol melamine and a diamino s-triazinyl sulfamyl-phenyl-carbamyl-methyl sulfide.

18. A composition comprising the product of reaction of ingredients comprising melamine, formaldehyde and a diamino s-triazinyl sulfamyl-phenyl-carbamyl-methyl sulfide.

19. A resinous composition comprising the product of reaction of (1) a partial condensation product of ingredients comprising urea, formaldehyde and diamino s-triazinyl parasulfamyl-phenyl-carbamyl-methyl sulfide, and (2) a chlorinated acetamide.

20. The method of preparing new condensation products which comprises effecting reaction between ingredients comprising an aldehyde and a compound corresponding to the general formula

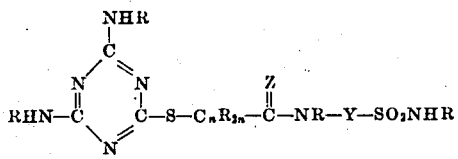

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

GAETANO F. D'ALELIO.